D. JARVES.
Apparatus for Treating Animal Matter.
No. 233,417. Patented Oct. 19, 1880.
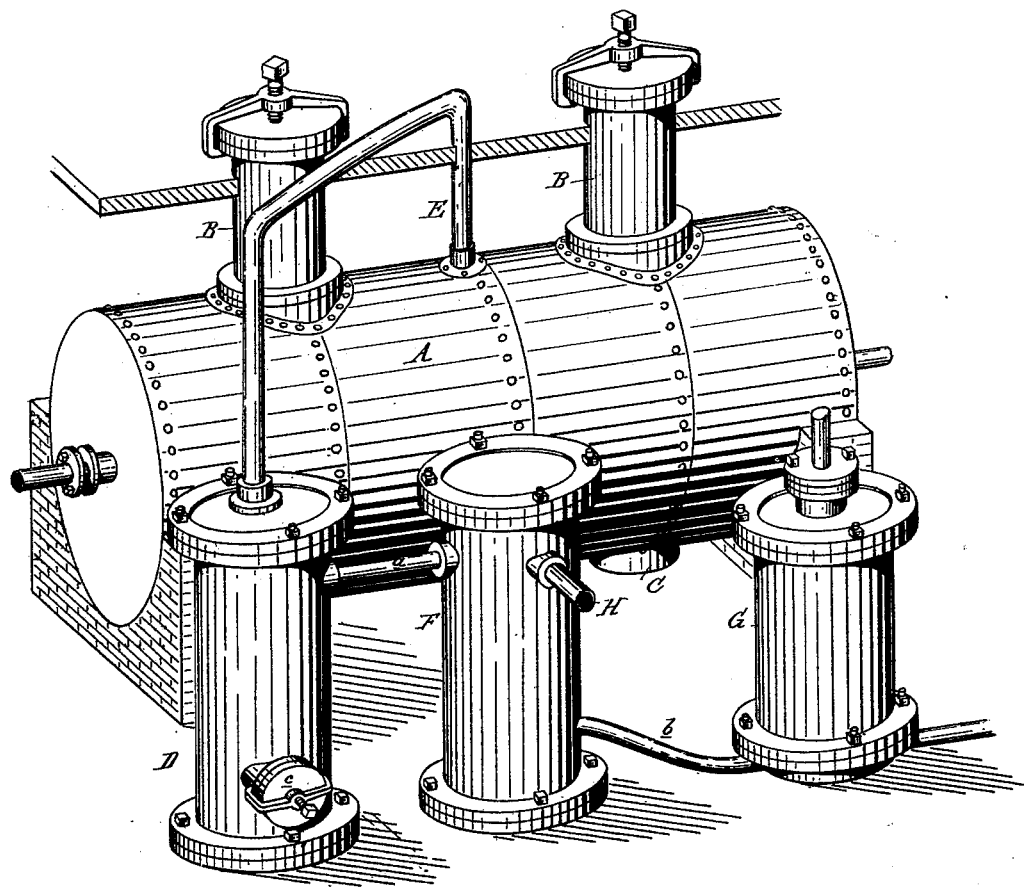

UNITED STATES PATENT OFFICE.

DEMING JARVES, OF DETROIT, MICHIGAN.

APPARATUS FOR TREATING ANIMAL MATTER.

SPECIFICATION forming part of Letters Patent No. 233,417, dated October 19, 1880.

Application filed June 4, 1879.

*To all whom it may concern:*

Be it known that I, DEMING JARVES, of Detroit, in the county of Wayne and State of Michigan, have invented an Improvement in Apparatus for Treating Animal Matter, of which the following is a specification.

The nature of my invention relates to certain new and useful improvements in apparatus for drying or treating animal matter, whereby the expense of such treatment is materially reduced and the escape of noxious gases is prevented.

The invention consists in the peculiar construction and arrangement of the various parts to accomplish the desired result, all as more fully hereinafter set forth.

The drawing represents my invention in perspective.

In the accompanying drawing, which forms a part of this specification, A represents a cylinder provided with the usual pipes B, through which the matter to be treated is introduced into the cylinder, and the discharge-pipes C. These pipes B and C should be provided with tight-fitting heads, so as to make the cylinder as nearly air-tight as is possible. The cylinder is arranged so that the matter contained therein may be acted upon by the direct application of heat or by the application of steam, the cylinder being of any of the known constructions for the purpose. Near this cylinder I place a receiving chamber or cylinder, D, which is connected to the cylinder A by the pipe E. A pipe, *a*, connects the chamber D with a condensing-chamber, F, which, in turn, is connected to a vacuum-pump, G, by the pipe *b*. The cylinder D is provided with a man-hole near its lower end, which is closed by a tightly-fitting head, *c*; and H is a pipe through which cold water is admitted to the condensing-chamber F.

The receiving or settling chamber D is employed in lieu of conducting the steam and gases directly into the condenser F by a pipe from the cylinder A, in order that the solid matter contained in the steam and gases may settle in the bottom of the cylinder D, whence they may readily be removed through the opening *c*. If the steam and gases were conducted immediately from the cylinder A to the condenser F, the solid matter contained therein would settle at the bottom of the condenser and clog the pumps.

In practice the cylinder A is charged or filled with the animal matter to be treated through the pipes B, which are then closed by their covers. Heat is then applied in any convenient manner to the cylinder, which causes the inclosed matter to throw off its noxious gases and steam, which, if allowed to escape into the open air, would be a source of great annoyance and offense to the neighborhood in which the works were located, as well as to the workmen. This I obviate by putting the pump G in motion, thus creating a vacuum, which compels the steam and gases to pass through the pipe E into the chamber D, and thence into the condensing-chamber F, where they come in contact with a stream of cold water admitted through the pipe H, which rapidly condenses the steam and noxious gases, which are then led into any suitable sewer or drain, and are carried off in the form of water.

Should there be any sediment settle in the bottom of the chamber D it can be readily removed through the man-hole.

By this construction and arrangement of parts the escape of noxious gases is prevented, while at the same time the expense is materially lessened, as it takes less heat to produce the desired action upon the material than in devices where the steam and gases are allowed to escape into the open air.

I am aware of the patents granted to I. Turner for treating offal and manufacturing gas, dated July 1, 1873, No. 140,391, and W. H. McNeil for deodorizing apparatus, dated December 26, 1871, No. 122,273, and I therefore lay no claim to such invention or any of the devices contained therein.

I am also aware that the gases and steam arising from treating animal matter by heat in an apparatus constructed for that purpose have heretofore been conducted from the rendering-cylinder to a condenser containing water, in which a partial vacuum is formed by means of an exhaust-fan, pump, or equivalent mechanical device, the gases being thence conducted into the fire-chamber to be consumed, or elsewhere, and I therefore lay no claim, broadly, to such construction, my invention being confined to an improvement in that class of apparatus for treating animal matter by heat in which a partial vacuum is created by a pump or other equivalent device, whereby the steam and noxious gases are first conducted into a settling-chamber, from which the solid matters contained in the steam and gases may be removed through a man-hole, in contradistinction to conducting the steam and gases directly into the condenser, thus preventing said solid materials from clogging or interfering with the operation of said pump or its equivalent device.

What I claim as my invention is—

In that class of apparatus for treating animal matter in which a vacuum-pump or other equivalent device is employed, the combination, with the rendering-chamber A, provided with the feed-pipes B and discharge-pipe C, of the settling-chamber D, having the man-hole c, condensing-chamber F, having pipe H, exhaust-pump G, and connecting-pipes E *a b*, the whole constructed, arranged, and operated in the manner and for the purpose set forth.

DEMING JARVES.

Witnesses:
H. S. SPRAGUE,
CHAS. THURMAN.